April 12, 1927.
C. P. KOTTLOWSKI
1,624,892
CHAIN DRIVE
Filed Nov. 30, 1925
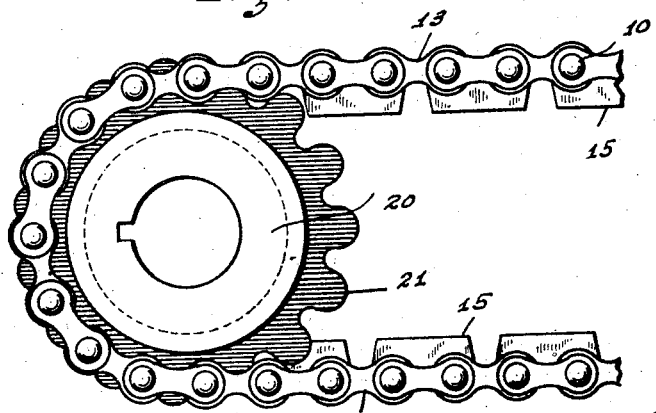
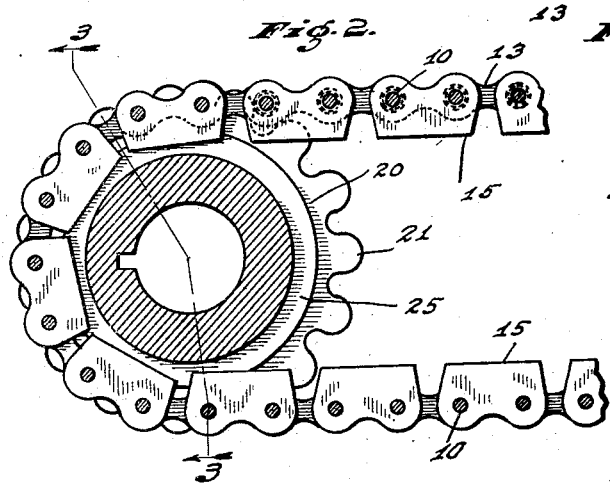
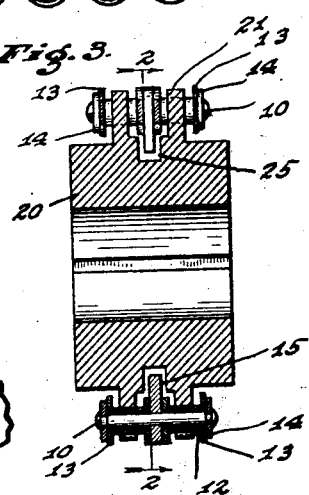
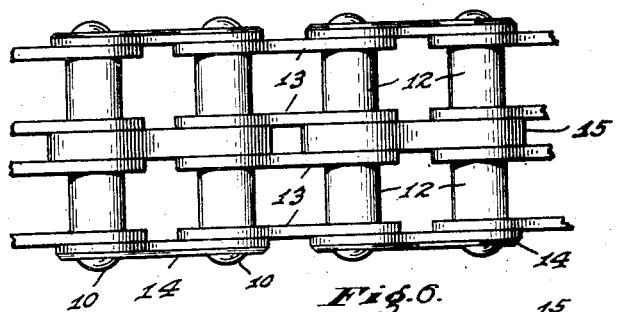
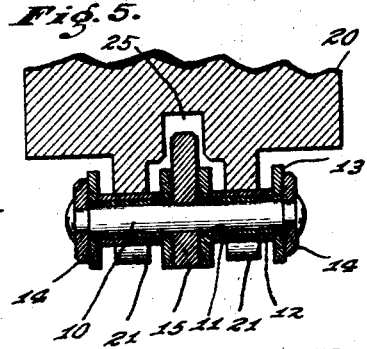
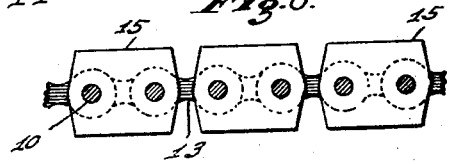
INVENTOR.
CLARENCE P. KOTTLOWSKI,
BY
ATTORNEY.

Patented Apr. 12, 1927.

1,624,892

UNITED STATES PATENT OFFICE.

CLARENCE P. KOTTLOWSKI, OF INDIANAPOLIS, INDIANA, ASSIGNOR TO DIAMOND CHAIN AND MANUFACTURING COMPANY, OF INDIANAPOLIS, INDIANA, A CORPORATION OF INDIANA.

CHAIN DRIVE.

Application filed November 30, 1925. Serial No. 72,158.

It is the object of my invention to locate a drive chain in its proper place on a co-operating sprocket independently of the sprocket teeth; so that not only will the chain be kept on the sprocket, but wear between the side faces of the sprocket teeth and parts of the chain will be eliminated, and the destructive action between the corners of the teeth and any bars of the chain which pass along sides of the teeth will be avoided.

It is more especially the object of my invention to obtain these results in chains in which tooth-engaging members in the plane of the sprocket teeth are interconnected by tension members which pass along the sides of the sprocket teeth, such as in the well-known roller type, rollerless bushing type, stud type, and block type of chain; as it is that style of chain in which the tension bars of the chain regularly pass along the sides of the sprocket teeth, and in which interference often occurs between such tension bars and the sides and corners of the sprocket teeth, especially when there is a misalinement between the sprockets the chain connects.

In carrying out my invention, I provide in the sprocket a circumferential groove the side walls of which are axially spaced from the side faces of the sprocket teeth; and provide the chain with guide links which co-operate with such groove to control the location of the chain on the sprocket. If the chain has bars which pass along the sides of the sprocket teeth, the clearance which is provided between the sides of the guide links and the side walls of the groove in the sprocket is made less than the clearance between the sides of the teeth and those side bars of the chain which come closest to such tooth sides; so that such chain side-bars will be kept out of contact with the sides and corners of the teeth, and thus their destructive interaction will be prevented.

The accompanying drawing illustrates my invention: Fig. 1 is an elevation of a fragment of a roller chain and a sprocket constructed in accordance with my invention; Fig. 2 is a sectional view taken from the same viewpoint as Fig. 1, but with the section taken on the line 2—2 of Fig. 3, or through the circumferential groove of the sprocket; Fig. 3 is an axial section, substantially on the line 3—3 of Fig. 2, through the sprocket and chain; Fig. 4 is a plan of the chain shown in Fig. 1; Fig. 5 is a fragmental enlargement of the lower portion of Fig. 3; and Fig. 6 is a fragmental view of a modified chain which may have reverse bends.

I have illustrated my invention in connection with a bushed-roller type chain; but this is merely by way of example, and not by way of restriction, because my invention in its broader sense is applicable to any type of transmission chain, and in its subgeneric sense is applicable to any type of chain in which toothengaging members in the plane of the sprocket teeth are connected by tension members which pass along the sides of the sprocket teeth.

In the particular type of roller chain shown, which is the bushed-roller type, there are a series of cross-pins 10 on which are mounted bushings 11 within rollers 12. The rollers 12 lie between side-bars 13, which are mounted on the ends of the bushings 12; these side-bars 13 are the ones which come closest to the sides of the sprocket teeth, and are interfered with by the sides and corners of the sprocket teeth in the ordinary type of roller chain. There are also tension bars 14 and 15 which interconnect adjacent pins 10 in the series, and which with the side-bars 13 constitute the tension members of the chain; but these tension members 14 and 15 are farther from the sprocket teeth than are the side-bars 13. The tension members 15 are specially made in accordance with my invention, but the other parts so far described may be of any standard construction.

There may be any number of bushings 11 on a pin 10, each bushing having associated with it two side-bars 13 and a roller 12 between such side-bars, with the pins 10 interconnected by tension members 14 or 15 at the ends and at any number of intermediate points between the ends of adjacent bushings 11 on a pin 10; though in one plane, desirably an intermediate plane, the special tension members 15 are provided. In the double chain shown, there are two bushings on each cross-pin 10; and the special tension members 15, or guide links, are provided in the intermediate plane between the adjacent ends of these two bushings.

The chain co-operates with any number of sprockets 20, of which only one is shown. Each sprocket has any number of rows of teeth 21; the sprocket shown having two rows, as the number of such rows of teeth corresponds to the number of bushings 11 on a cross-pin 10. These teeth co-operate with the rollers 12 in the usual manner of roller chains; and when there are a plurality of rows of teeth 21, they are suitably axially spaced to co-operate with the several series of rollers which the chain has. There is considerable clearance between the side faces of the teeth 21 and the adjacent side-bars 13 of the chain; although this clearance is exaggerated in the drawings. It is these side faces, and the tooth corners at the outer ends of these side faces, which in the ordinary chain interfere with the side-bars 13; resulting in great wear in case of misalinement, and making it necessary that the outer corners of the teeth be beveled to guide the chain on to the sprocket teeth without actual binding. By eliminating this interaction between the side faces of the teeth 21 and the side-bars 13 of the chain, I eliminate this wear, lengthen the life of the chain and of the sprocket, make it unnecessary to bevel the outer corners of the teeth 21 (though such beveling is not prohibited in my construction), and reduce the ill effects of misalinement.

Therefore, I provide in the sprocket 20 a circumferential groove 25, which co-operates with the special tension members or guide links 15. The plane of this circumferential groove 25 is axially spaced from the plane of any row of teeth 21, and is desirably between two circumferential rows of teeth 21 if the sprocket has a plurality of such rows of teeth. As shown, the circumferential groove 25 in the sprocket is a center groove, between the two rows of teeth 21 which this sprocket is shown as having; but this exact location is merely one which is desirable when the sprocket has exactly two rows of teeth, and is not a limiting one, even when the sprocket has exactly two rows of teeth. The side walls of the groove 25 are axially spaced from the side faces of any teeth 21; and in the arrangement shown, such side faces of the groove are closer together than are the adjacent side faces of the teeth 21 which lie at the two sides of such groove. The groove 25 in its entirety lies radially inward from the bases of the teeth 21, so that the outer corners of such groove may be unnotched circles.

The guide links 15, which lie in the same general plane as the groove 25, project into such groove to guide the chain on the sprocket. These guide links 15 are slightly narrower than the groove 25, so that there may be ample clearance for relative movement, especially as they enter the groove; but this clearance between the side faces of the guide links 15 and the side walls of the groove 25 is less than the clearance between the side faces of the teeth 21 and the inner faces of the side-bars 13, so that the side-bars 13 never touch the side faces of the teeth. If desired, to facilitate the entrance of the guide links 15 into the groove 25, the entering corners of both the groove and the guide links, where they first co-operate as the guide links enter the grooves, may be slightly beveled or rounded; though this is not essential.

In order that the guide links may project into the groove 25, when the latter is located as shown, such guide links project materially farther from the plane defined by the pins 10 than do the side bars 13 or the regular tension members 14, on that side of the chain which is toward the co-operating sprockets. The guide links 15, however, also serve as tension members, paralleling the tension members 14, and on their edges remote from the sprocket they may be shaped exactly to correspond with the regular tension members 14, if the chain is to operate without any reverse bends. If there are any reverse bends, of course, the guide links 15 project on both sides of the chain, as is indicated in Fig. 6.

In operation, the chain shown acts in general like the ordinary roller chain, power being transmitted between the teeth 21 and the cross-pins 10 through the intermediary of the bushings 11 and rollers 12, and being transmitted between adjacent bushings and adjacent pins by the tension members 13, 14, and 15. However, in my construction, the chain is held in proper position by the co-operation of the guide links 15 with the groove 25, and thus the side faces of the teeth 21 are prevented from interfering with and from being interfered with by the side-bars 13, since such side bars never engage such teeth.

I claim as my invention:—

1. In combination, a sprocket, and a chain; said sprocket having one or more rows of teeth, and also having a circumferential groove whose side walls are in different planes transverse to the axis from those of the side faces of the teeth; and said chain having cross members and longitudinal members interconnecting said cross members, and including guide members which project into said circumferential groove in the sprocket and co-operates therewith to prevent said longitudinal members from engaging the side faces of the sprocket teeth.

2. In combination, a sprocket, and a chain;

said sprocket being provided with one or more rows of teeth, and also having a circumferential groove whose side walls are in different planes transverse to the axis from those of the side faces of the teeth; and said chain including both tooth-engaging portions and portions which pass along the sides of the teeth, and being provided with guide members which project into and co-operate with the groove in the sprocket to keep the sprocket teeth from engaging the chain portions which extend along the sides of the sprocket teeth.

3. In combination, a chain, and a sprocket; said chain having a plurality of rows of teeth, and also having a circumferential groove located between two rows of teeth and having its side walls closer together than are the adjacent side faces of those two rows of teeth; and a chain having cross members and longitudinal members connecting said cross members, and including guide members which project into the groove in the sprocket to locate the chain on the sprocket and prevent said longitudinal members from engaging the side faces of the sprocket teeth.

4. In combination, a chain, and a sprocket; said sprocket having one or more rows of teeth, and also having a circumferential groove whose side walls are in different planes transverse to the axis from those of the side faces of said teeth; and said chain comprising a series of members in the plane of each row of teeth for co-operating with the teeth of that row, and a plurality of tension members which pass the teeth at the sides thereof and interconnect the chain members which lie in the plane of the teeth, some of said tension members being guide links which are arranged to project into the groove in the sprocket to keep said tension members out of contact with the side faces of the sprocket teeth.

5. In combination, a chain, and a sprocket; said sprocket having one or more rows of teeth, and also having a circumferential groove whose side walls are in different planes transverse to the axis from those of the side faces of said teeth; and said chain comprising a series of members in the plane of each row of teeth for co-operating with the teeth of that row, and a plurality of tension members which pass the teeth at the sides thereof and interconnect the chain members which lie in the plane of the teeth, said chain including guide members which are arranged to project into the groove in the sprocket to keep said tension members out of contact with the side faces of the sprocket teeth.

6. In combination, a chain, and a sprocket; said sprocket having one or more series of teeth, and also having a circumferential groove which is located wholly radially inward from the bases of said teeth and which has its side walls axially displaced from all side faces of the teeth; and said chain being provided with cross members and longitudinal members, some of said longitudinal members having portions which project into said groove when the chain is co-operating with the sprocket and co-operate with the side walls of the groove to hold the longitudinal members out of engagement with the side faces of the teeth.

7. In combination, a sprocket, and a chain; said sprocket having a plurality of rows of teeth, and also having a circumferential groove which lies between two rows of teeth and has side walls in different planes transverse to the axis from those of the side faces of the adjacent rows of teeth; and said chain comprising a series of members which lie in the plane of each row of teeth of the sprocket, and longitudinal members which interconnect the members lying in the plane of the sprocket teeth, said longitudinal members including members which lie between the planes of adjacent rows of sprocket teeth and pass by such teeth on the sides thereof, said chain also having portions which project into said groove in the sprocket to position the chain on the sprocket and keep said longitudinal members out of contact with the sprocket teeth.

8. In combination, a sprocket, and a chain; said sprocket having a plurality of rows of teeth, and also having a circumferential groove which lies between two rows of teeth and has side walls in different planes transverse to the axis from those of the side faces of the adjacent rows of teeth; and said chain comprising a series of members which lie in the plane of each row of teeth of the sprocket, and longitudinal members which interconnect the members lying in the plane of the sprocket teeth, said longitudinal members including members which lie between the planes of adjacent rows of sprocket teeth and pass by such teeth on the sides thereof, some of said longitudinal members including portions which project into said groove in the sprocket to position the chain on the sprocket and keep said longitudinal members out of contact with the sprocket teeth.

9. In combination, a chain, and a sprocket; said sprocket having one or more rows of teeth, and also having a circumferential groove which lies wholly radially inward from the bases of said teeth and has its side walls separate from the side faces of the teeth; and a chain having a series of members for co-operating with each row of sprocket teeth, and longitudinal bars which pass by the sprocket teeth at the sides thereof and interconnect said members which co-operate with the sprocket teeth, there being such longitudinal bars on both sides of each row of sprocket teeth, some of said longitudinal bars being extended beyond the others to project into said circumferential groove in the sprocket.

10. In combination, a chain, and a sprocket; said sprocket having one or more rows of teeth, and a circumferential groove which lies wholly radially inward from the bases of said teeth and has its side walls separate from the side faces of the teeth; and a chain having a series of members for co-operating with each row of sprocket teeth, and longitudinal bars which pass by the sprocket teeth at the sides thereof and interconnect said members which co-operate with the sprocket teeth, some of said longitudinal bars being extended beyond the others to project into said circumferential groove in the sprocket.

In witness whereof, I have hereunto set my hand at Indianapolis, Indiana, this 27th day of November, A. D. one thousand nine hundred and twenty-five.

CLARENCE P. KOTTLOWSKI.